United States Patent
Walp (10) Patent No.: US 9,499,435 B2
(45) Date of Patent: *Nov. 22, 2016

(54) HEAT TREATABLE ARTICLE WITH SCREEN AND/OR INKJET PRINTED COATING THEREON, AND/OR METHOD OF MAKING THE SAME

(71) Applicant: Guardian Industries Corp., Auburn Hills, MI (US)

(72) Inventor: Matthew S. Walp, Royal Oak, MI (US)

(73) Assignee: Guardian Industries Corp., Auburn Hills, MI (US)

( * ) Notice: Subject to any disclaimer, the term of this patent is extended or adjusted under 35 U.S.C. 154(b) by 596 days.

This patent is subject to a terminal disclaimer.

(21) Appl. No.: 13/919,619

(22) Filed: Jun. 17, 2013

(65) Prior Publication Data

US 2014/0370209 A1    Dec. 18, 2014

(51) Int. Cl.
C03C 17/34 (2006.01)
B32B 17/10 (2006.01)
(Continued)

(52) U.S. Cl.
CPC ....... *C03C 17/3411* (2013.01); *B32B 17/1022* (2013.01); *B32B 17/10036* (2013.01); *B32B 17/10201* (2013.01); *B32B 17/10266* (2013.01); *B32B 17/10935* (2013.01); *C03C 17/3435* (2013.01); *C03C 17/3482* (2013.01); *C03C 17/36* (2013.01); *C03C 17/366* (2013.01); *C03C 17/3639* (2013.01); *C03C 17/3644* (2013.01);
(Continued)

(58) Field of Classification Search
CPC ... C03C 17/04; C03C 17/34; C03C 17/3644; C03C 17/366; C03C 17/36; Y10T 428/24851; Y10T 428/31518; B32B 37/06; B32B 38/0004; B32B 38/0036
See application file for complete search history.

(56) References Cited

U.S. PATENT DOCUMENTS

| 5,383,990 A | 1/1995 | Tsuji |
| 5,443,669 A | 8/1995 | Tünker |

(Continued)

FOREIGN PATENT DOCUMENTS

| WO | WO 2008/101539 | 8/2008 |
| WO | WO 2012/109417 | 8/2012 |

(Continued)

OTHER PUBLICATIONS

CeramiGlass—OPH Product Data Sheet, possibly as early as Jan. 13, 2013, pp. 1-3.

(Continued)

*Primary Examiner* — Donald J Loney
(74) *Attorney, Agent, or Firm* — Nixon & Vanderhye P.C.

(57) ABSTRACT

Certain example embodiments of this invention relate to coated articles including substrates that support printed patterns and thin film layer stacks that can have the patterns and the layer stacks formed thereon and then be cut, heat treated, and optionally built into an insulated glass unit, laminated to another substrate, and/or used in another product. In certain example embodiments, this is made possible by bonding to the glass the frit material used in forming the pattern, re-annealing the glass following the bonding, disposing the thin film layer stack on the re-annealed substrate supporting the bonded pattern, and then cutting and heat treating. The frit advantageously does not re-melt during heat treatment because the melting temperature is higher than the temperature used in heat treatment. Associated methods also are provided.

12 Claims, 4 Drawing Sheets

(51) Int. Cl.
*E06B 3/66* (2006.01)
*C03C 17/36* (2006.01)
*C03C 17/04* (2006.01)
*B32B 37/06* (2006.01)
*B32B 38/00* (2006.01)

(52) U.S. Cl.
CPC ........... *E06B 3/6604* (2013.01); *B32B 37/06* (2013.01); *B32B 38/0004* (2013.01); *B32B 38/0036* (2013.01); *B32B 2307/304* (2013.01); *C03C 17/04* (2013.01); *C03C 2217/948* (2013.01); *C03C 2218/119* (2013.01); *Y10T 428/24876* (2015.01)

(56) References Cited

U.S. PATENT DOCUMENTS

| | | | |
|---|---|---|---|
| 5,510,188 | A | 4/1996 | Vockler |
| 6,158,247 | A | 12/2000 | Didelot |
| 6,318,125 | B1 | 11/2001 | Diederen et al. |
| 6,887,575 | B2 | 5/2005 | Neuman et al. |
| 7,056,588 | B2 | 6/2006 | Neuman et al. |
| 7,140,204 | B2 | 11/2006 | Vandal |
| 7,189,458 | B2 | 3/2007 | Ferreira et al. |
| 7,198,851 | B2 | 4/2007 | Lemmer et al. |
| 7,387,816 | B2 | 6/2008 | Thomsen et al. |
| 7,566,481 | B2 | 7/2009 | Veerasamy |
| 7,771,830 | B2 | 8/2010 | Neuman et al. |
| 7,879,202 | B2 | 2/2011 | Murphy |
| 7,998,320 | B2 | 8/2011 | Laird et al. |
| 8,003,164 | B2 | 8/2011 | Petrmichl et al. |
| 8,114,488 | B2 | 2/2012 | Alvarez |
| 8,236,118 | B2 | 8/2012 | Veerasamy |
| 8,524,337 | B2 | 9/2013 | Lemmer et al. |
| 2006/0150680 | A1* | 7/2006 | Hill .................. B32B 17/10247 65/60.2 |
| 2006/0228500 | A1* | 10/2006 | Collins .................. C03C 27/06 428/34 |
| 2009/0115922 | A1 | 5/2009 | Veerasamy |
| 2010/0215967 | A1 | 8/2010 | Blacker et al. |
| 2011/0157703 | A1 | 6/2011 | Broadway et al. |
| 2011/0212311 | A1 | 9/2011 | Lemmer et al. |
| 2012/0048722 | A1 | 3/2012 | McLean et al. |
| 2012/0057236 | A1 | 3/2012 | Broadway et al. |
| 2012/0164420 | A1 | 6/2012 | Lemmer et al. |
| 2012/0196133 | A1 | 8/2012 | Broadway et al. |
| 2012/0207952 | A1* | 8/2012 | Walp .................. B23K 26/0063 428/34 |
| 2012/0219821 | A1 | 8/2012 | Frank et al. |

FOREIGN PATENT DOCUMENTS

| | | |
|---|---|---|
| WO | WO 2012/110513 | 8/2012 |
| WO | WO 2013/166367 | 11/2013 |

OTHER PUBLICATIONS

U.S. Appl. No. 13/716,320, filed Dec. 17, 2012; Theios.
U.S. Appl. No. 13/727,767, filed Dec. 27, 2012; Liang et al.
U.S. Appl. No. 13/795,264, filed Mar. 12, 2013; Vandal et al.
U.S. Appl. No. 13/795,356, filed Mar. 12, 2013; Walp.
U.S. Appl. No. 13/835,278, filed Mar. 15, 2013; Veerasamy.
U.S. Appl. No. 13/905,189, filed May 30, 3013; Wang et al.
U.S. Appl. No. 13/919,592, filed Jun. 17, 2013; Walp et al.

* cited by examiner

HEAT TREATABLE ARTICLE WITH SCREEN AND/OR INKJET PRINTED COATING THEREON, AND/OR METHOD OF MAKING THE SAME

FIELD OF THE INVENTION

Certain example embodiments of this invention relate to coated articles including substrates supporting, in order moving away from the substrate, printed patterns and thin film layer stacks, and/or methods of making the same. More particularly, certain example embodiments relate to coated articles including substrates that support printed patterns and thin film layer stacks that can have the patterns and the layer stacks formed thereon and then be cut, heat treated, and optionally built into an insulated glass unit, laminated to another substrate, and/or used in another product. The frit advantageously does not re-melt during heat treatment because its melting temperature is higher than the temperature used in heat treatment.

BACKGROUND AND SUMMARY OF EXAMPLE EMBODIMENTS OF THE INVENTION

It is known to screen print frit patterns on glass substrates, e.g., in connection with decorative bands, solar control "dot" patterns, etc. Screen printed articles may be laminated to other substrates and used in, for example, automotive applications such as windshields. A screen printed article also may be connected to another substrate and used to form an insulated glass unit (IG unit or IGU). Inkjet printing has been used an alternative to screen printing.

Figure 1:
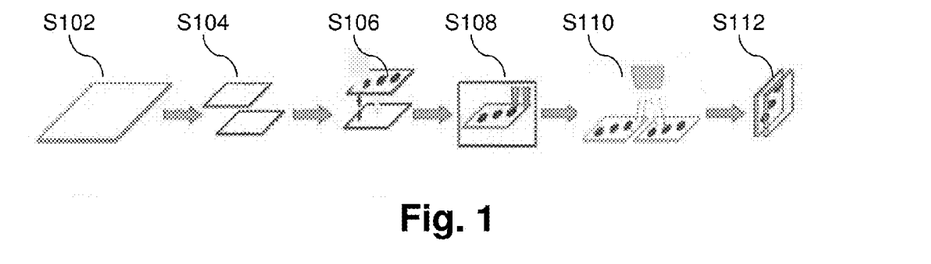
FIG. 1 schematically demonstrates a process conventionally used in forming an IGU with a screen printed coated article.

In this vein, FIG. 1 schematically demonstrates a process conventionally used in forming an IGU with a screen printed coated article. A stock glass sheet is provided in step S102. The stock sheet is cut to size in step S104, and frit material in the desired pattern(s) is/are silkscreen or inkjet printed on the substrate in step S106. In step S108, a high temperature heat treatment (HT) operation such as heat strengthening and/or thermal tempering is carried out, which also in some cases helps to cure the frit material that is silkscreen or inkjet printed on the substrate and/or to fuse it to the substrate. A thin film layer stack optionally is formed over the patterned layer in step S110, e.g., to form a low emissivity (low-E), antireflective (AR), and/or other functional coating. The thin film layer stack may be formed via sputtering and/or the like. The coated article that includes the substrate with the printed pattern and the thin film layer(s) thereon may be built into an IG unit in step S112, e.g., by providing a second substrate and maintaining the second substrate and the coated article in substantially parallel spaced apart relation to one another using a spacer and an edge seal provided around a peripheral area of one or both of the substrates. In this example, ceramic frit patterns may be provided on interior and/or exterior glass surfaces of the substrate. When low-E coatings are provided, they typically are oriented on an interior facing surface of the substrate.

The ceramic frit materials typically used in conventional processes require high temperatures to form a strong bond with the glass. Temperatures in excess of 500 degrees C., and generally between 500-650 degrees C., are common. This high temperature requirement is convenient in the sense that it allows bonding processes to be performed in connection with the high temperature heat treatment processes associated with heat strengthening and/or thermal tempering, as alluded to above. Indeed, rapid cooling or quenching typically follows the high temperature fusing process, thereby heat treating the article with the pattern thereon. Furthermore, because the sputter or other coating processes happen in post-HT operations, the actual coatings do not necessarily need to be heat treatable.

Unfortunately, however, as is known, HT operations also involve rapid cooling or quenching processes after firing, e.g., to induce stresses in the substrate that "toughen" it, but that effectively prevent cutting, sizing, drilling, and/or other operations. Thus, although there are some efficiency gains in terms of combining frit material curing and/or bonding processes with high temperature HT processes, other efficiency gains cannot be achieved. For example, although it would be desirable to be able to perform HT processes following the blanket coating of the thin film layer stack on a large stock sheet of glass or the like, this currently is not possible because a second high temperature process associated with HT processes that has been separated from frit bonding processes would cause the frit material to re-melt and/or reintroduce stresses in the underlying substrate.

Thus, it will be appreciated that there is a need in the art for improved heat treatable articles with printed coatings thereon, and/or methods of making the same. For instance, it will be appreciated that it would be desirable to provide an arrangement where it is possible to print or otherwise form a frit or frit-like pattern on a substrate and overcoat a thin film layer stack on the pattern, prior to sizing and heat treatment operations. It also will be appreciated that it would be desirable to provide increased resistance to cracking, better bonding and/or durability of the coating, etc.

In certain example embodiments, a method of making a coated article is provided. A frit material is printed on a glass substrate. The glass substrate with the frit material thereon is heated at a first temperature in order to bond the frit material to the glass substrate in a desired pattern. Following the heating, the glass substrate is re-annealed by cooling the glass substrate in a manner that is controlled to be sufficiently slow to maintain and/or create stress in the glass substrate that is the same or similar to that present in the substrate prior to said heating. Following said re-annealing, a coating is disposed on the glass substrate and over the desired pattern. The glass substrate is cit to a desired size. The cut glass substrate with the desired pattern and the coating thereon is heat treated at a second temperature in making the coated article, with the second temperature being lower than the first temperature.

In certain example embodiments, a method of making a coated article is provided. A coating is disposed on a glass substrate and over a desired frit pattern printed on and bonded to the glass substrate when the glass substrate is in a stress state that permits cutting. The glass substrate is cut to a desired size. The cut glass substrate with the desired frit pattern and the coating thereon is heat treated at a temperature sufficiently high to cause said heat treating but sufficiently low to avoid melting frit material associated with the desired frit pattern in making the coated article.

In certain example embodiments, a method of making a coated article is provided. A frit material is printed on a glass substrate. The glass substrate with the frit material thereon is heated at a first temperature in order to bond the frit material to the glass substrate in a desired pattern. Following the heating, the glass substrate is re-annealed by cooling the glass substrate in a manner that is controlled to be sufficiently slow to maintain and/or create stress in the glass substrate that is the same or similar to that present in the substrate prior to said heating. Following said re-annealing, the glass substrate is forwarded to a fabricator to enable the fabricator to dispose a coating on the glass substrate and over the desired pattern, cut the glass substrate to a desired size, and heat treat at a second temperature the cut glass substrate with the desired pattern and the coating thereon, with the second temperature being lower than the first temperature.

In certain example embodiments, a large stock glass sheet is provided. A frit pattern is printed on a major surface of the large stock glass sheet, where frit material used in forming the frit pattern has a melting temperature greater than temperatures associated with heat treatment. A heat treatable thin film coating is provided on the major surface of the large stock glass sheet and over the frit pattern. A stress state of the large stock glass sheet is generally consistent with annealed and/or re-annealed glass and thus permits cutting.

In certain example embodiments, methods of providing insulated glass (IG) units, laminated articles, sized substrates, etc., may be made using these and/or other techniques. Corresponding and/or other products also are envisioned herein.

The features, aspects, advantages, and example embodiments described herein may be combined to realize yet further embodiments.

BRIEF DESCRIPTION OF THE DRAWINGS

These and other features and advantages may be better and more completely understood by reference to the following detailed description of exemplary illustrative embodiments in conjunction with the drawings, of which.

DETAILED DESCRIPTION OF EXAMPLE EMBODIMENTS OF THE INVENTION

Certain example embodiments of this invention relate to coated articles including substrates that support printed patterns and thin film layer stacks that can have the patterns and the layer stacks formed thereon and then be cut, heat treated, and optionally built into an insulated glass unit, laminated to another substrate, and/or used in another product. In certain example embodiments, this process flow is made possible by bonding to the glass the frit material used in forming the pattern at an elevated temperature, re-annealing the glass following the bonding, disposing the thin film layer stack on the re-annealed substrate supporting the bonded pattern, and then cutting and heat treating. The frit advantageously does not re-melt during heat treatment because the melting temperature is higher than the temperature used in heat treatment. Associated methods also are provided in certain example embodiments.

Figure 2:
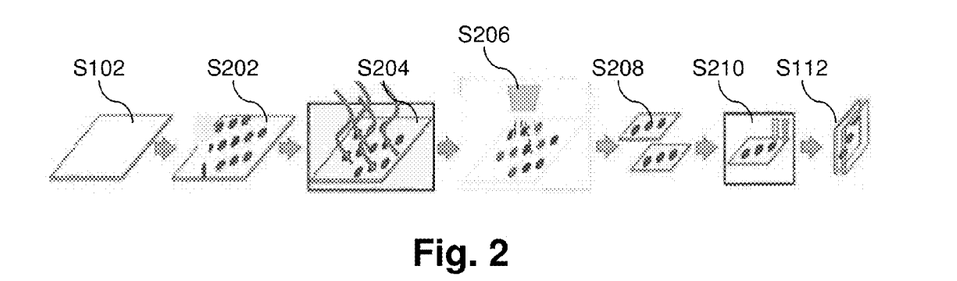
FIG. 2 schematically demonstrates a process that may be used to make a heat treated coated article comprising a glass substrate supporting a printed pattern and a thin film layer stack, in accordance with certain example embodiments.

Referring now more particularly to the drawings in which like reference numerals indicate like parts throughout the several views, FIG. 2 schematically demonstrates a process that may be used to make a heat treated coated article comprising a glass substrate supporting a printed pattern and a thin film layer stack, in accordance with certain example embodiments. As with FIG. 1, a stock glass sheet is provided in step S102. However, instead of cutting the stock glass sheet prior to applying the frit pattern, FIG. 2 shows the frit pattern bring applied to the stock glass sheet in step S202. The frit pattern may be applied via any suitable process and associated apparatus such as, for example, via silkscreen printing, inkjet printing, etc. The frit used in connection with certain example embodiments may have relatively high firing and/or bonding temperatures. The frit in certain example embodiments preferably has firing and/or bonding temperatures greater than 500 degrees C., more preferably greater than 550 degrees, still more preferably greater than 600 degrees C., and still more preferably greater than 650 degrees C. In certain example embodiments, the firing and/or bonding temperatures of the frit may be between about 650-800 degrees C.

As is known, ceramic frits typically are composed of ground glass with a specific softening point combined with metals and oxides (e.g., bismuth (and/or an oxide thereof), nickel (and/or an oxide thereof), chromium oxide, cobalt oxide, and/or nickel oxide, etc.) to attain the desired color (often a dark or black color), adhesion properties, durability, etc. The frit materials of certain example embodiments may include inorganic powders with organic binders and solvents. The frits of certain example embodiments generally will include about even weight percents of inorganic solid powder material, and binders and solvents. For instance, the frits of certain example embodiments may include about 50 wt. % inorganic solid powder material, and about 50 wt. % binder and solvent materials. A variety of different materials may be used for providing the pigment portions of the frits of certain example embodiments. For instance, in certain example cases, black pigments may comprise or consistent essentially of iron oxide powders of any suitable stoichiometry, and white pigments may comprise or consistent essentially of titania. The glassy portion of the frit may in certain example embodiments comprise 10-20 wt. % silicon or silicon oxide, 10-20 wt. % titanium or titanium oxide, and additional materials such as, for example, boron, aluminum, zirconium, and/or the like, in ceramic form.

High temperature firing and/or bonding is performed in step S204. When firing at the elevated temperatures noted above, the glass substrate becomes soft. The current process of forming a pattern involves rapid cooling or quenching, e.g., as a part of the high temperature fusing operation. However, if rapid cooling or quenching were performed in connection with the high temperature firing and/or bonding performed in step S204, then stresses would be introduced into the substrate, making the large stock sheet a heat treated and thus "uncuttable" product. However, in order to reduce the likelihood of residual stresses from forming in the glass upon firing that would effectively prevent cutting, the glass may be cooled slowly and in a controlled manner in connection with a re-annealing process. In other words, heat treatment and re-annealing is performed in connection with step S204 in order to fire the frit and bond it to the substrate while maintaining or restoring stresses in the substrate such that the substrate can be cut, sized, drilled, and/or otherwise manipulated in subsequent operations. The temperature profile selected for the slow cooling should be slow enough to promote re-annealing.

The re-annealing of certain example embodiments may maintain and/or create stresses in the glass that are the same or similar to those present in the glass when it came out of the fabrication line. Re-annealing may be performed by reducing the glass substrate temperature from the temperature used with firing (e.g., from 600-650 degrees C. and sometimes around 700 degrees C.) down to temperatures that can be easily handled by human operators and/or machines. For instance, the temperature preferably will be reduced to about 300-315 degrees C., more preferably to about 100-150 degrees C., or even lower. Sometimes, the substrate may be cooled or allowed to cool to room temperature, if needed and/or desired. The cooling preferably is accomplished at line speed, which typically is about 24 ft./min. Preferably, the cooling can be accomplished at speeds of at least about 10-25 ft./min., more preferably 15-25 ft./min., or even higher. The cooling in certain example embodiments may take place in 1-30 minutes, more preferably 3-15 minutes, and preferably in less than 10 minutes. Example cool times are 4 minutes and 5 minutes, although other cool times may be used in different embodiments. The cooling of the substrate may or may not be constant in different cases. In certain example embodiments, staged cooling may be used, e.g., in connection with a multi-zone apparatus (such as, for example, a 10 zone furnace or the like).

As alluded to above, the stresses under the pattern preferably are the same as or similar to those found in the substrate as it came off of the fabrication line. Certain example embodiments generally will involve substrates that are 3-12 mm thick (although different example embodiments may involve thinner or thicker substrates). The target stresses for 3 mm and 12 mm thick substrates are 70 psi and 240 psi, respectively. At an example thickness of 6 mm, the target stresses may be about 150 psi. Certain example embodiments preferably will deviate by no more than 25% of this target value, more preferably no more than 15% of this target, and still more preferably by no more than 10% of the target. However, it has been observed that stresses of up to about 2× these respective example target values can in some situations result in working embodiments.

In step S206, the fired printed image may then be overcoated with a heat treatable thin film (e.g., via sputtering, chemical vapor deposition, combustion deposition, or the like) and/or with a thicker wet-applied coating (e.g., applied via dip, spin, roll, curtain, vertical slot die, meniscus, or other coating technique). Thus, a stock sheet with a combination frit printed pattern and coating that still is cuttable may be produced.

In step S208, the stock sheet may be cut to size, and the smaller sized pieces may be heat treated (e.g., heat strengthened and/or thermally tempered) in step S210. The frit does not re-melt during the heat treatment associated with step S208 because the melting temperature of the frit preferably is higher than the temperatures associated with the heat treatment.

An optional lower temperature drying process may be introduced prior to the high temperature firing. However, lower temperature drying without achieving bonding (e.g., as promoted in the high temperature process associated with step S204) has been found to create a partially fired pattern that lacks a desired level of durability. For instance, lower temperature drying alone oftentimes will allow the frit to re-melt, making the overall coating less durable during the manufacturing process and even after the overlying thin film coating is formed.

As above, in step S112, the heat treated article with the pattern and the thin film coating thereon may be built into an IG unit, e.g., by providing a second substrate and maintaining the second substrate and the coated article in substantially parallel spaced apart relation to one another using a spacer and an edge seal provided around a peripheral area of one or both of the substrates. The IG unit may be a two-pane, three-pane, etc., IG unit, in different example embodiments.

In certain example embodiments, the heat treated article with the pattern and the thin film coating thereon may be laminated to another substrate to produce a laminated article. Any suitable laminating material (such as, for example, polyvinyl butyral (PVB), ethyl vinyl acetate (EVA), polyethylene terephthalate (PET), polymethyl methacrylate (PMMA), polyurethane (PU), and/or the like) may be used in different example embodiments. The laminated article may be built into an IG unit, or used monolithically. In still other example embodiments, the heat treated article with the pattern and the thin film coating thereon may be built into a vacuum insulated glass (VIG) unit. VIG units are known to include a plurality of pillars and a frit-based edge seal that maintains first and second glass substrates in substantially parallel spaced apart orientation. The gap or cavity between the substrates is held at a pressure less than atmospheric.

Roughness of the pattern also has been linked to resistivity and thus emissivity in conductive and/or low-E coatings. By providing a smooth coating, it is possible in certain example embodiments to ensure that there is no marked deviation in the sheet resistance and/or emissivity, as between a coating provided on a glass substrate and a coating provided over a pattern printed on the substrate. Certain example embodiments preferably result in a conductivity difference of no more than 25%, more preferably no more than 20%, and still more preferably no more than about 10-15%. In one example, Applicant produced a SunGuard SN68 HT coating on unprinted and printed glass substrates. SunGuard SN68 HT coated glass is commercially available from the assignee of the instant invention. See also, for example, U.S. Pat. Nos. 6,475,626; 6,495,263; 6,558,800; 6,667,121; 6,686,050; 6,692,831; 6,863,928; 6,887,575; 6,936,347; 7,217,460; and 7,858,191, which are each incorporated herein by reference in their entireties.

With respect to chemical stability, re-melting of the frit may sometimes promote outgassing of frit materials and/or flowing of the frit material into the layer(s) of the overlying coatings. In any event, it would be desirable to provide chemical stability in the sense that outgassing is minimized or avoided, e.g., to help avoid releasing potentially hazardous materials and/or materials that could interfere with the processing apparatus.

Chemical stability also may be thought of in terms of there being no or practically no chemical interaction between the thin film and layers in the overlying layer stack.

Example screen printing techniques are set forth in, for example, U.S. application Ser. Nos. 13/795,356 and 13/795,264, both filed on Mar. 12, 2013, both incorporated herein by reference in their entireties. In addition to being able to use these example screen printing techniques in connection with high temperature firing frits, it is noted that these application also disclose lower melting point frits and/or paints. These frits and/or paints may be modified, thereby enabling heat treatment, e.g., in the form of heat strengthening and/or thermal tempering.

In certain example embodiments, it may be desirable to change the surface energy of the substrate to be coated to in turn alter the contact angle of the substrate. A pre-heating process may, for example, be used to heat the surface of the substrate up to about 100 degrees C. By lowering the contact angle in this manner, it has been found that the quality of the printed patterns can be improved, e.g., in terms of higher resolution and/or better use of the ink. This is particularly true for inkjet printed patterns. By providing a hydrophilic surface with a contact angle of less than 90 degrees, more preferably less than 75 degrees, and still more preferably less than 60 degrees, and sometimes even less than 45 degrees, the ink tends to resist the so-called "lotus effect" of simply rolling off the surface and spreads out, thereby more efficiently using the drop of ink.

Providing a lower contact angle for the substrate also has been found to assist with forming a pattern. As indicated above, the ink cross-sectionally spreads out. Thus, there is a lower likelihood of sharp edges or steps being formed. This also may have advantages in terms of the properties of the overlying coating. For instance, the resistivity may be lower for a conductive and/or low-E coating, e.g., because the likelihood of discontinuities associated with sharp steps or the like can be reduced.

Figure 3:
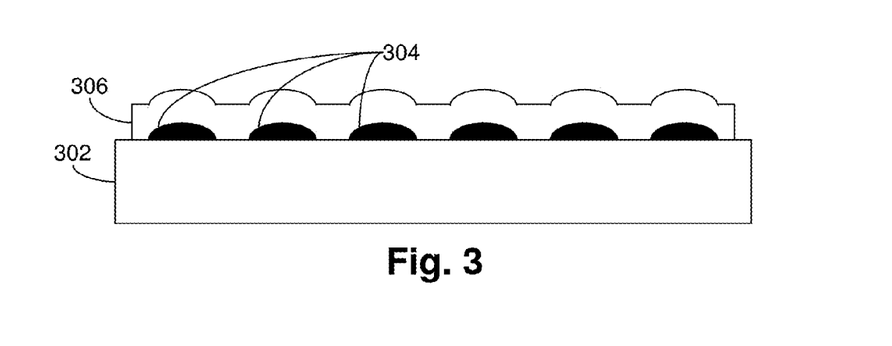
FIG. 3 is a cross-sectional view of an article with a thin film coating overlying a printed pattern, in accordance with certain example embodiments.

FIG. 3 is a cross-sectional view of an article with a thin film coating overlying a printed pattern, in accordance with certain example embodiments. FIG. 3 includes a substrate 302 (e.g., a glass substrate) supporting a printed pattern 304. A thin film coating 306 (which may have one or more layers in different example embodiments) is provided over the substrate 302 and the printed pattern 304. It is noted that the thin film coating 306 is shown as being at least generally conformal with respect to the underlying pattern 304 in the FIG. 3 example; however, different example embodiments may involve a flattening and/or leveling coating 306.

Figure 4:
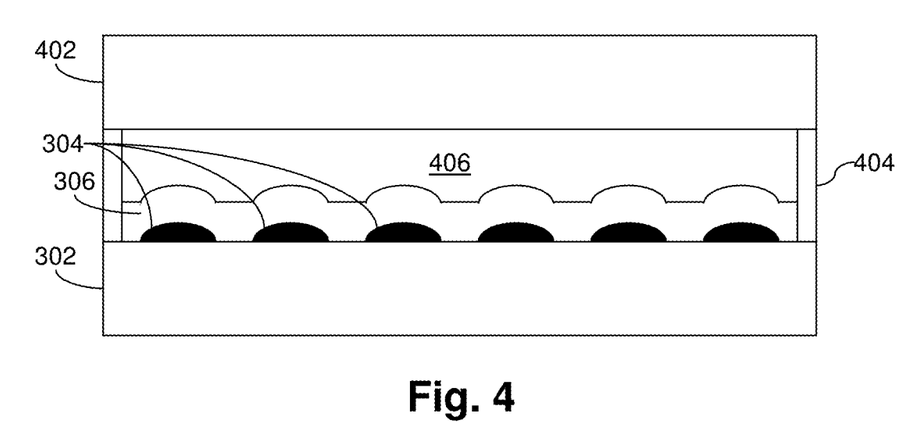
FIG. 4 is a cross-sectional view of an insulated glass unit including the example coated article of FIG. 3, in accordance with certain example embodiments.

FIG. 4 is a cross-sectional view of an insulated glass unit including the example coated article of FIG. 3, in accordance with certain example embodiments. It will be appreciated that in FIG. 4, a second substrate 402 is provided in substantially parallel spaced apart relation to the coated article shown in FIG. 3. The first and second substrates 302 and 402 are maintained in substantially parallel spaced apart relation using a spacer system 404, e.g., disposed peripheral areas of the first and/or second substrate 302/402, and a gap or cavity 406 is defined between the substrates 302 and 402. Example spacer systems are disclosed in, for example, U.S. Publication No. 2012/0304591, the entire contents of which are hereby incorporated by reference. In certain example embodiments, the gap or cavity 406 may be at least partially filled with an inert gas such as, for example, Ar, Kr, Xe, and/or the like, with or without $O_2$ gas.

As shown in FIG. 4, the pattern 304 and the coating 306 are provided on an interior surface (e.g., surface 2 or 3) of the substrate. However, in certain example embodiments, the pattern 304 and the coating 306 may be provided on both interior surfaces 2 and 3, and/or on one or both exterior surfaces (e.g., surface 1 and/or 4). The type of thin film coating that is used may, for example, suggest a different placement. In other words, and in a related vein, although certain example embodiments have been described in connection with silver-based low-E coatings, other coatings may be provided in different example embodiments and the other coatings may be provided on different surfaces. For instance, anti-scratch, anti-graffiti, and/or so-called low-maintenance glass coatings may be provided over or in place of silver-based and/or other low-E coatings, and also may be located on surface 1 and/or surface 4 in certain example embodiments. Coated articles with mar-reducing overcoats and methods of making the same are disclosed in, for example, U.S. Publication No. 2010/0215967, the entire contents of which are hereby incorporated herein. Coated articles with scratch and/or etchant resistant coatings and methods of making the same are disclosed in, for example, U.S. Pat. Nos. 8,003,164; 7,879,202; 7,566,481; 7,387,816, as well as U.S. application Ser. No. 13/905,189 filed May 30, 3013, the entire contents of each of which are hereby incorporated herein. An AR coating with self-cleaning properties is disclosed in U.S. application Ser. No. 13/727,767 filed Dec. 27, 2012.

Low-E coatings may for example comprise first and second dielectric layers or layer stacks sandwiching a silver-based layer. One, two, three, four, or more layers of silver may be separated by dielectric layers or layer stacks, which each dielectric layer being of or including Ti, Zn, Sn, Si, Ni, Cr, and/or combinations thereof, in metallic, oxided, nitrided, and/or oxynitrided form(s). The dielectric layers may be used to tune optical and/or other properties of the low-E coating.

Figure 5:
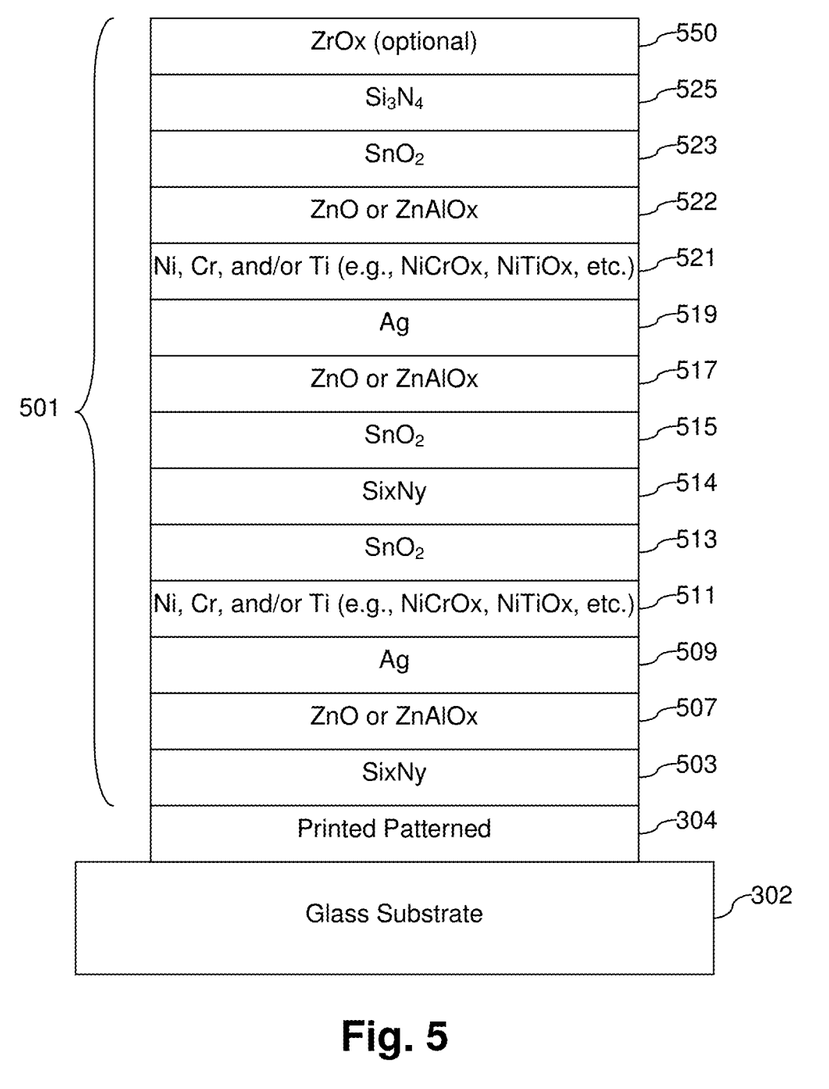
FIG. 5 is an example double silver-based low-E coating that may be used in connection with certain example embodiments.

An example double silver-based low-E coating 501 that may be used in connection with certain example embodiments is shown in FIG. 5. The low-E coating 501 is provided over the printed pattern 304, and both the low-E coating 501 and the printed pattern 304 are supported by the substrate 302. The coating (or layer system) 501 includes: dielectric silicon nitride inclusive layer 503, which may be $Si_3N_4$, of the Si-rich type for haze reduction, or of any other suitable stoichiometry in different embodiments; first lower contact layer 507 (which contacts IR reflecting layer 509); first conductive and preferably metallic infrared (IR) reflecting layer 509; first upper contact layer 511 (which contacts layer 509); dielectric layer 513 (which may be deposited in one or multiple steps in different embodiments); another silicon nitride inclusive layer 514; tin oxide inclusive interlayer 515; second lower contact layer 517 (which contacts IR reflecting layer 519); second conductive and preferably metallic IR reflecting layer 519; second upper contact layer 521 (which contacts layer 519); dielectric layer 523; and protective dielectric layer 525; and optional protective durability enhancing protective layer 550, which may comprise zirconium oxide. The "contact" layers 507, 511, 517, and 521 each contact at least one IR reflecting layer (e.g., layer based on Ag). An optional dielectric layer comprising titanium oxide (e.g., $TiO_2$ or any other suitable stoichiometry such as, for example, substoichiometric TiOx) may be provided between the printed pattern and the first silver-based layer 509, e.g., for optical purposes in certain example embodiments.

The upper contact layers 511 and 521 may be of or include nickel (Ni) oxide, chromium/chrome (Cr) oxide, titanium (Ti) oxide, or a nickel alloy oxide such as nickel chrome oxide (NiCrOx), nickel titanium oxide (NiTiOx), or other suitable material(s), in certain example embodiments. The use of, for example, NiCrOx and/or NiTiOx in these layers (511 and/or 521) allows durability to be improved. The layers 511 and/or 521 may be fully oxidized in certain embodiments (i.e., fully stoichiometric), or alternatively may only be partially oxidized. In certain instances, the layers 511 and/or 521 may be at least about 50% oxidized. Contact layers 511 and/or 521 may or may not be oxidation graded in different embodiments. Oxidation grading means that the degree of oxidation in the layer changes throughout the thickness of the layer so that, for example, a contact layer may be graded so as to be less oxidized at the contact interface with the immediately adjacent IR reflecting layer than at a portion of the contact layer(s) further or more/most distant from the immediately adjacent IR reflecting layer. Contact layers 511 and/or 521 may or may not be continuous in different embodiments across the entire IR reflecting layer.

Lower contact layers 507 and/or 517 in certain embodiments are of or include zinc oxide (e.g., ZnO). The zinc oxide of layers 507 and 517 may contain other materials as well, such as, for example, Al (e.g., to form ZnAlOx). In certain example embodiments, one or more of zinc oxide layers 507 and 517 may be doped with from about 1 to 10% Al, more preferably from about 1 to 5% Al, and most preferably about 1 to 4% Al.

Alternative low-E coatings may be based on ITO or the like. For instance, an ITO-based layer may be sandwiched between first and second layers comprising silicon (e.g., layers comprising silicon oxide, silicon nitride, and/or silicon oxynitride). Such ITO-based low-E coatings may in some cases be more durable than silver-based low-E coatings, e.g., because ITO is less susceptible to corrosion than Ag and may in certain example embodiments be provided on surfaces 1 and/or 4 for anticondensation and/or other purposes. See, for example, U.S. Publication Nos. 2012/0164420, 2012/0048722, and 2011/0212311, the entire contents of each of which are hereby incorporated by reference.

Figure 6:
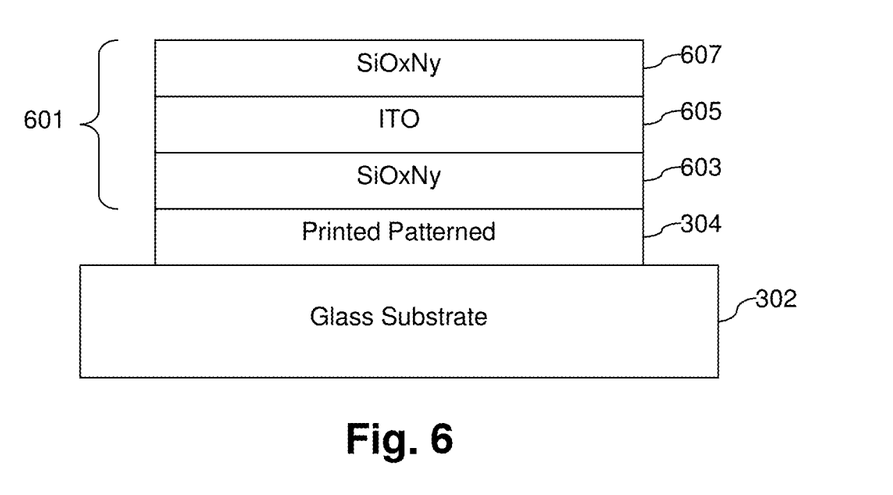
FIG. 6 is an example ITO-based low-E coating that may be used in connection with certain example embodiments.

FIG. 6 is an example ITO-based low-E coating that may be used in connection with certain example embodiments. FIG. 6 is similar to FIG. 5 in the sense that it includes a low-E coating 601 provided over the printed pattern 304, with both the low-E coating 601 and the printed pattern 304 being supported by the substrate 302. The coating (or layer system) 601 includes: first and second silicon-inclusive dielectric layers 603 and 607 sandwiching a layer comprising ITO 605. The first and second dielectric layers 603 and 607 may be oxided and/or nitrided in certain example embodiments. For instance, the first and second dielectric layers each may be of or include $SiO_xN_y$ in certain example embodiments.

Example thicknesses and indices of refraction for each of the layers is provided in the table that follows:

Transparent conductive coatings (TCCs) may be provided in place of or in addition to (e.g., over or under) low-E coatings in certain example embodiments. The TCCs may include layers of or comprising ITO, ZnO, AZO, IGZO, carbon nanotubes, graphene, and/or the like. Techniques for growing graphene, forming graphene-inclusive coatings, etc., can be found in U.S. Pat. No. 8,236,118, the entire contents of which are hereby incorporated herein. Techniques for forming carbon nanotube (CNT) inclusive coatings, etc., can be found in U.S. Pat. No. 8,236,118, the entire contents of which are hereby incorporated herein. In such cases, the frit pattern may be a part of a decorative border or band that helps to conceal electrical or other mechanical connections, e.g., in electronic devices such as touch screens, flat panel displays (e.g., LCDs, PDPs, etc.), automotive or other vehicular applications, and/or the like.

"Bird friendly" coatings may be provided in certain example embodiments in place of or in addition to low-E coatings in certain example embodiments. See, for example, U.S. patent application Ser. No. 13/716,320 filed Dec. 17, 2012, as well as U.S. Pat. No. 8,114,488, both of which are hereby incorporated herein in their entireties. In addition to, or in place of, using the thin film coating to reduce the likelihood of bird collisions, certain example embodiments may use the frit pattern to help in this respect. For instance, a frit pattern (e.g., with dots, a grid, and/or the like) that adheres to the "2×4 rule" (e.g., and has a spacing between adjacent horizontal elements of less than or equal to about 2" and a spacing between adjacent vertical elements of less than or equal to about 4") may be used for such purposes.

As alluded to above, AR coatings and/or the like also may be provided in place of or in addition to the low-E coatings. In certain example embodiments, AR coatings may be provided on some or all major surfaces where a low-E coating is not present. Sputter deposited heat treatable AR coatings are disclosed in, for example, U.S. Publication Nos. 2012/0196133, 2012/0057236, and 2011/0157703. See also U.S. application Ser. No. 13/835,278, filed on Mar. 15, 2013. The entire contents of each of these documents are hereby incorporated by reference herein.

|  | Example Thickness Range (nm) | First Example Thickness (nm) | Second Example Thickness (nm) | Example Index of Refraction Range | Preferred Index of Refraction Range | First Example Index of Refraction | Second Example Index of Refraction |
|---|---|---|---|---|---|---|---|
| $SiO_xN_y$ | 30-100 | 60 | 70 | 1.5-2.1 | 1.7-1.8 | 1.75 | 1.7 |
| ITO | 95-160 | 105 | 105 | 1.7-2.1 | 1.8-1.93 | 1.88 | 1.9 |
| $SiO_xN_y$ | 30-100 | 65 | 70 | 1.5-2.1 | 1.7-1.8 | 1.75 | 1.7 |
| Glass | N/A | N/A | N/A | N/A | N/A | N/A | N/A |

Other variants of this layer stack are possible in different embodiments of this invention. Such variants may include, for example, using partially or fully oxided and/or nitrided layers for the first and/or second silicon-inclusive layers, adding a protective overcoat comprising ZrOx, adding one or more index matching layers (e.g., comprising TiOx) between the glass substrate and the second silicon-inclusive layer, etc. For instance, certain example embodiments may involve modifying the FIG. 6 example layer stack so as to replace the top layer comprising SiOxNy with SiN, add a layer comprising ZrOx (e.g., to potentially increase durability), both replace the top layer comprising SiOxNy with SiN and add a layer comprising ZrOx, etc. Thus, it will be appreciated that the possible modifications listed herein may be used in any combination or sub-combination.

Although certain example embodiments have been described in connection with dot patterns, it will be appreciated that the patterns of certain example embodiments may include, for example, large blocks of one or more solid colors, completely solid colors for an entire substrate, textures, images, logos, licensed images/designs, arbitrary designs, and/or the like, in different example instances. In certain example embodiments, it is possible to print patterns that differ for each side of the substrate, e.g., by printing patterns of frit or other material over one another. For example, with good registration as between different patterns formed by different passes of inkjet nozzles and/or serial inkjet nozzle ejection, etc., it is possible to create different colors and/or views from different sides of the substrate, e.g., in example embodiments where dots are printed directly on one another. Hardware optics with software based feedback and control may be used to help with registration of dot and/or other patterns in certain example embodiments.

It is noted that the example printing techniques described herein may be used to "blanket coat" one or more major surfaces of a substrate, in its entirety or substantially in its entirety. When both major surfaces are coated, the same or different colors, patterns, designed, etc., may be used, at the same or different registrations. The surfaces may be acid or otherwise etched in certain example embodiments, e.g., prior to the blanket coating, in order to create a desirable aesthetic appearance for certain applications.

"Peripheral" and "edge" do not mean that the components described as being provided as such locations are oriented at the absolute periphery or edge of the substrate or unit, but instead mean that components are at least partially located at or near (e.g., within about two inches) an edge of at least one substrate and/or the unit. Likewise, "edge" as used herein is not limited to the absolute edge of a glass substrate or unit but also may include an area at or near (e.g., within about two inches) of an absolute edge of the substrate(s) and/or unit.

The terms "heat treatment" and "heat treating" as used herein mean heating the article to a temperature sufficient to achieve thermal tempering and/or heat strengthening of the glass inclusive article. This definition includes, for example, heating a coated article in an oven or furnace at a temperature of at least about 550 degrees C., more preferably at least about 580 degrees C., more preferably at least about 600 degrees C., more preferably at least about 620 degrees C., and most preferably at least about 650 degrees C. for a sufficient period to allow tempering and/or heat strengthening. This may be for at least about two minutes, or up to about 10 minutes, in certain example embodiments.

Although a layer, layer system, coating, or the like, may be said to be "on" or "supported by" a substrate, layer, layer system, coating, or the like, other layer(s) may be provided therebetween. Thus, for example, the paints, coatings, and/or layers described above may be considered "on" and "supported by" the substrate and/or other paints, coatings, and/or layers even if other layer(s) are provided therebetween.

In certain example embodiments, a method of making a coated article is provided. A frit material is printed on a glass substrate. The glass substrate with the frit material thereon is heated at a first temperature in order to bond the frit material to the glass substrate in a desired pattern. Following the heating, the glass substrate is re-annealed by cooling the glass substrate in a manner that is controlled to be sufficiently slow to maintain and/or create stress in the glass substrate that is the same or similar to that present in the substrate prior to said heating. Following said re-annealing, a coating is disposed on the glass substrate and over the desired pattern. The glass substrate is cit to a desired size. The cut glass substrate with the desired pattern and the coating thereon is heat treated at a second temperature in making the coated article, with the second temperature being lower than the first temperature.

In addition to the features of the previous paragraph, in certain example embodiments, the printing may be inkjet printing and/or screen printing.

In addition to the features of either of the two previous paragraphs, in certain example embodiments, the first temperature may be greater 650 degrees C. and/or the second temperature may be less than or equal to 660 degrees C.

In addition to the features of any of the three previous paragraphs, in certain example embodiments, the first temperature may be 650-800 degrees C. and/or the second temperature may be sufficiently high to result in heat strengthening and/or thermal tempering of the glass substrate.

In addition to the features of any of the four previous paragraphs, in certain example embodiments, the heat treating may comprise quenching, whereas the re-annealing may not involve quenching.

In addition to the features of any of the five previous paragraphs, in certain example embodiments, the disposing of the coating may be practiced by wet applying a thick coating on the glass substrate and over the desired pattern, and/or by sputter depositing a multi-layer thin film coating on the glass substrate and over the desired pattern.

In addition to the features of the previous paragraph, in certain example embodiments, the multi-layer thin film coating may be a multi-layer low-E coating comprising at least one silver-based infrared reflecting layer sandwiched between first and second dielectric layer stacks and/or a multi-layer low-E coating comprising an infrared reflecting layer comprising ITO sandwiched between first and second layers comprising silicon.

In certain example embodiments, a method of making a coated article is provided. A coating is disposed on a glass substrate and over a desired frit pattern printed on and bonded to the glass substrate when the glass substrate is in a stress state that permits cutting. The glass substrate is cut to a desired size. The cut glass substrate with the desired frit pattern and the coating thereon is heat treated at a temperature sufficiently high to cause said heat treating but sufficiently low to avoid melting frit material associated with the desired frit pattern in making the coated article.

In certain example embodiments, a method of making a coated article is provided. A frit material is printed on a glass substrate. The glass substrate with the frit material thereon is heated at a first temperature in order to bond the frit material to the glass substrate in a desired pattern. Following the heating, the glass substrate is re-annealed by cooling the glass substrate in a manner that is controlled to be sufficiently slow to maintain and/or create stress in the glass substrate that is the same or similar to that present in the substrate prior to said heating. Following said re-annealing, the glass substrate is forwarded to a fabricator to enable the fabricator to dispose a coating on the glass substrate and over the desired pattern, cut the glass substrate to a desired size, and heat treat at a second temperature the cut glass substrate with the desired pattern and the coating thereon, with the second temperature being lower than the first temperature.

In certain example embodiments, a method of making an insulated glass unit is provided. A coated article made in accordance with any of the nine previous paragraphs is provided. The coated article and a second glass substrate are sealed together in connection with an edge seal and a spacer system, such that the coated article and the second glass substrate are in substantially parallel spaced apart orientation to one another, with a gap being defined therebetween. In cases where a low-E coating is provided (e.g., in connection with the paragraph three prior to this paragraph), in certain example embodiments, the multi-layer low-E coating may be provided on an interior major surface (e.g., where it includes one or more Ag-based infrared reflecting layers) and/or an exterior major surface (e.g., where it includes one or more ITO-based infrared reflecting layers) of the insulated glass unit. Alternatively, or in addition, in certain example embodiments, a method of making a laminated article is provided. A coated article is made in accordance with any of the nine preceding paragraphs. The coated article is laminated to another substrate via a polymer-based interlayer.

In certain example embodiments, a large stock glass sheet is provided. A frit pattern is printed on a major surface of the large stock glass sheet, where frit material used in forming the frit pattern has a melting temperature greater than temperatures associated with heat treatment. A heat treatable thin film coating is provided on the major surface of the large stock glass sheet and over the frit pattern. A stress state of the large stock glass sheet is generally consistent with annealed and/or re-annealed glass and thus permits cutting.

In addition to the features of the previous paragraph, in certain example embodiments, the heat treatable thin film coating may be a multi-layer thin film low-E coating comprising at least one silver-based infrared reflecting layer sandwiched between first and second dielectric layer stacks and/or a multi-layer thin film low-E coating comprising an infrared reflecting layer comprising ITO sandwiched between first and second layers comprising silicon.

In certain example embodiments, an insulated glass unit is provided. A coated article may be cut from the large stock glass sheet according to either of the two prior paragraphs and heat treated. A second glass substrate is provided. A spacer system and an edge seal help to maintain the heat treated coated article and the second glass substrate in substantially parallel spaced apart relation to one another, with a gap or cavity defined therebetween. In cases where a low-E coating is provided for an insulated glass unit (e.g., in connection with the preceding paragraph), in certain example embodiments, the multi-layer low-E coating may be provided on an interior major surface (e.g., where it includes one or more Ag-based infrared reflecting layers) and/or an exterior major surface (e.g., where it includes one or more ITO-based infrared reflecting layers) of the insulated glass unit. Certain example embodiments may provide a laminated article (e.g., as an alternative to the insulated glass unit and/or as one or more panes in the insulated glass unit, described in this paragraph). A coated article may be cut from the large stock glass sheet according to either of the two prior paragraphs and heat treated. A second glass substrate is provided. A polymer-based interlayer laminates together the heat treated coated article and the second glass substrate. In cases where a low-E coating is provided for a laminated article (e.g., in connection with the preceding paragraph), in certain example embodiments, the multi-layer low-E coating may be provided on an interior major surface (e.g., where it includes one or more Ag-based infrared reflecting layers) and/or an exterior major surface (e.g., where it includes one or more ITO-based infrared reflecting layers) of the laminated article.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of making a coated article, the method comprising:
    printing a frit material on a glass substrate;
    heating the glass substrate with the frit material thereon at a first temperature in order to bond the frit material to the glass substrate in a desired pattern;
    following the heating, re-annealing the glass substrate by cooling the glass substrate in a manner that is controlled to be sufficiently slow to maintain and/or create stress in the glass substrate that is the same or similar to that present in the substrate prior to said heating;
    following said re-annealing, disposing a low-E coating on the glass substrate and over the desired pattern;
    after disposing the low-E coating on the glass substrate, cutting the glass substrate with the coating thereon to a desired size; and
    heat treating at a second temperature the cut glass substrate with the desired pattern and the coating thereon in making the coated article, the second temperature being lower than the first temperature.

2. The method of claim 1, wherein the printing is inkjet printing.

3. The method of claim 1, wherein the printing is screen printing.

4. The method of claim 1, wherein the first temperature is greater 650 degrees C. and the second temperature is less than or equal to 660 degrees C.

5. The method of claim 1, wherein the first temperature is 650-800 degrees C. and the second temperature is sufficiently high to result in thermal tempering of the glass substrate.

6. The method of claim 1, wherein the first temperature is 650-800 degrees C. and the second temperature is sufficiently high to result in heat strengthening of the glass substrate.

7. The method of claim 1, wherein the heat treating comprises quenching, whereas the re-annealing does not involve quenching.

8. The method of claim 1, wherein the disposing of the coating is practiced by wet applying a thick coating on the glass substrate and over the desired pattern.

9. The method of claim 1, wherein the disposing of the coating is practiced by sputter depositing a multi-layer thin film coating on the glass substrate and over the desired pattern.

10. The method of claim 9, wherein the low-E coating is a multi-layer low-E coating comprising at least one silver-based infrared reflecting layer sandwiched between first and second dielectric layer stacks.

11. The method of claim 9, wherein the low-E coating is a multi-layer low-E coating comprising an infrared reflecting layer comprising ITO sandwiched between first and second layers comprising silicon.

12. A method of making a laminated article, the method comprising:
    making a coated article in accordance with the method of claim 1; and
    laminating the coated article to another substrate via a polymer-based interlayer.

* * * * *